(No Model.)

C. F. A. KOBELKE.
RAT TRAP.

No. 334,443. Patented Jan. 19, 1886.

Witnesses:
J. B. Halpenny.
David Armstrong.

Inventor:
Charles F. A. Kobelke
By Gridley & Fletcher
Attys.

United States Patent Office.

CHARLES F. A. KOBELKE, OF CHICAGO, ILLINOIS.

RAT-TRAP.

SPECIFICATION forming part of Letters Patent No. 334,443, dated January 19, 1886.

Application filed June 26, 1885. Serial No. 169,811. (No model.)

*To all whom it may concern:*

Be it known that I, CHARLES F. A. KOBELKE, a subject of the Emperor of Germany, and a resident of Chicago, in the county of Cook and State of Illinois, have invented certain new and useful Improvements in Rat-Traps, of which the following is a description, reference being had to the accompanying drawings, in which—

Figure 1:
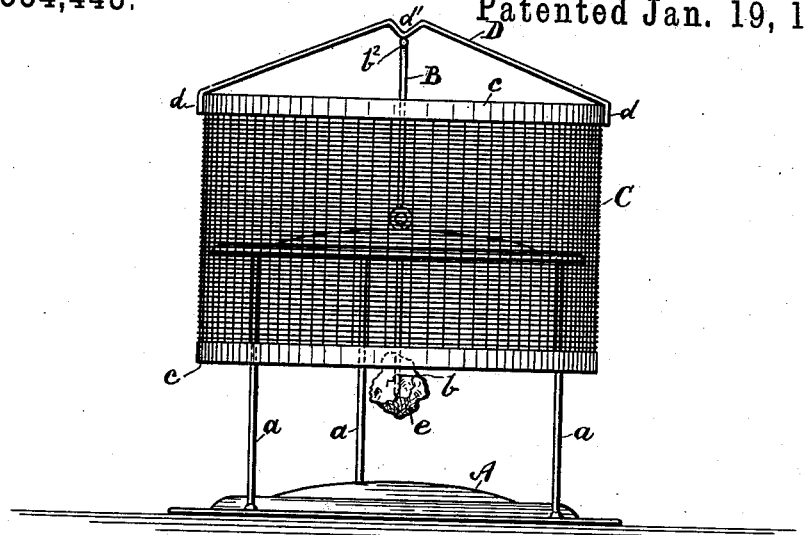
Figure 2:
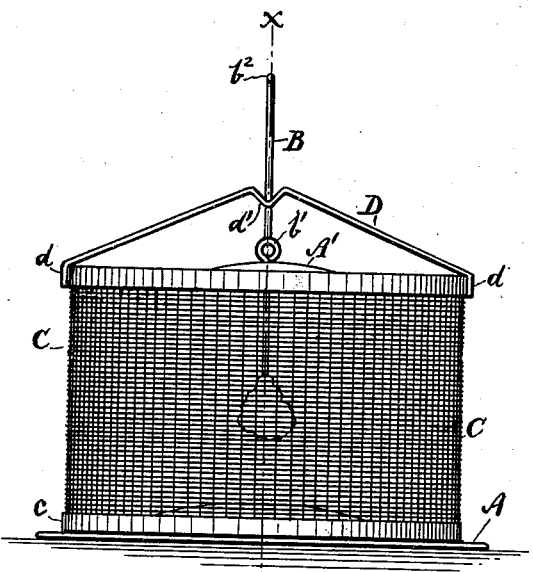
Figure 3:
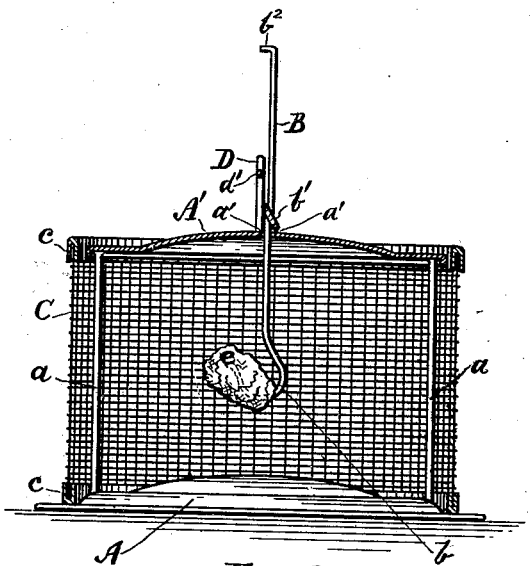

Figure 1 is a side elevation of said trap when set for use. Fig. 2 is a like view showing the same when sprung or closed; and Fig. 3 is a vertical sectional view thereof upon the line $x\ x$, Fig. 2.

Like letters of reference indicate like parts in the different figures.

The object of my invention is to provide a simple, cheap, and effective trap for rats, mice, and other vermin, the novel features of which are hereinafter more particularly described, and definitely pointed out in the claims.

In the drawings, A represents the base of said trap, which is preferably constructed from tin or other sheet metal, and is provided with a suitable number of standards or supports, $a\ a\ a$, rigidly attached thereto, to which the top A', preferably constructed from or lined with sheet metal, is permanently secured in any well-known manner, said top being somewhat smaller than the base. In the center of said top A', I provide a perforation, $a'$, Fig. 3, through which is loosely inserted a trigger, B, formed from a wire having a hook, $b$, on its lower end, and an enlargement or loop, $b'$, at or near the middle, to prevent said wire from dropping through the perforation. The wire is extended upwardly, as shown, and preferably bent at right angles at the top, substantially as shown at $b^2$, the normal position of said wire being vertical, as shown. The supports $a$ and top A' are surrounded by means of a cylindrical portion, C, open at the top and bottom, and preferably constructed of wire-netting or perforated sheet metal. Flanges $c\ c$ may be added for strengthening the same and protecting the edges of the wire-netting in case that material is used. The cylinder C should be of such a size as to enable it to be moved loosely up and down without friction or interference with the top A', while at the same time it may rest upon the base A, the latter being sufficiently large to project outwardly therefrom, as shown. The part C is provided with a bail, D, which is extended centrally across the same, and rigidly attached thereto by solder or otherwise at $d\ d$. Said bail is bent upwardly, as shown in Figs. 1 and 2, and is preferably provided with a concave bend or depression, $d'$, which is intended to rest pivotally upon the upper end or part, $b^2$, of the trigger B.

In setting said trap the cylinder C is raised and the hook $b$ provided with a suitable bait, $e$. The part $d'$ of the bail D is then placed carefully upon the top $b^2$ of the trigger B, when the trap is ready for use. As shown in Fig. 1, one or more animals may enter upon any side beneath the part C, and as soon as the bait is disturbed the trigger B is tripped and the part C falls, thus forming a complete cage for the animal or animals inclosed.

Having thus described my invention, what I claim, and desire to secure by Letters Patent, is—

1. An animal-trap consisting of a base with a top or cover having suitable supports, a cylinder open at top and bottom loosely surrounding the same, said cylinder being provided with a bail arranged to rest upon and suspend said cylinder from the top of a vertical trigger extending through and loosely supported by the top of said trap, substantially as and for the purposes specified.

2. The combination, in an animal-trap, of the base A and top A', connected by suitable standards, said top being provided with a loose or pivoted vertical trigger, and the open-ended cylinder C, having bail D, substantially as and for the purposes set forth.

CHARLES F. A. KOBELKE.

Witnesses:
D. H. FLETCHER,
J. B. HALPENNY.